United States Patent
Chaleff et al.

(10) Patent No.: US 6,856,440 B2
(45) Date of Patent: Feb. 15, 2005

(54) COPLANAR CAMERA SCANNING SYSTEM

(75) Inventors: Edward I. Chaleff, Doylestown, PA (US); Thomas J. Brobst, Allentown, PA (US)

(73) Assignee: ACCU-Sort Systems, Inc., Hatfield, PA (US)

( * ) Notice: Subject to any disclaimer, the term of this patent is extended or adjusted under 35 U.S.C. 154(b) by 0 days.

(21) Appl. No.: 10/676,834

(22) Filed: Sep. 30, 2003

(65) Prior Publication Data

US 2004/0201875 A1 Oct. 14, 2004

Related U.S. Application Data

(63) Continuation of application No. 09/810,204, filed on Mar. 16, 2001, now Pat. No. 6,628,445.
(60) Provisional application No. 60/190,273, filed on Mar. 17, 2000.

(51) Int. Cl.[7] .............................................. G02B 26/08
(52) U.S. Cl. ................. 359/205; 359/204; 250/227.2; 235/454
(58) Field of Search ............................... 359/196–226, 359/822–823, 738–742; 235/462.22–462.24, 462.32, 462.41, 462.42, 454; 250/201.2, 227.2, 227.26, 234

(56) References Cited

U.S. PATENT DOCUMENTS

| 4,427,286 A | 1/1984 | Bosse |
| 5,063,460 A | 11/1991 | Mutze et al. |
| 5,450,291 A | 9/1995 | Kumagai |
| 5,646,390 A | * 7/1997 | Wang et al. ................ 235/454 |
| 5,747,796 A | 5/1998 | Heard et al. |
| 5,798,516 A | 8/1998 | Shreesha |
| 5,914,477 A | 6/1999 | Wang |

FOREIGN PATENT DOCUMENTS

| EP | 0887676 | 12/1988 |
| EP | 0751669 | 1/1997 |

OTHER PUBLICATIONS

"Press Release for Accu–Sort Model AV3700" Jul. 12, 1999.

Patent Abstracts of Japan, vol. 007, No. 065 (E–165), For JP57–211869, Mar. 18, 1983.

* cited by examiner

Primary Examiner—James Phan
(74) Attorney, Agent, or Firm—Volpe and Koenig, P.C.

(57) ABSTRACT

A system for scanning objects having a linear array sensor, adapted to detect light input signals, is provided. A lens is optically connected to the linear array sensor, and is adapted to receive and transmit an optical image located in a field of view along a lens axis to the linear array sensor. A light source which generates an illumination stripe in general linear alignment with the lens axis is provided. A cylindrical lens is positioned between the light source and an object to be scanned. The cylindrical lens adapted to collect, transmit and focus light from the light source to form the illumination stripe.

21 Claims, 6 Drawing Sheets

COPLANAR CAMERA SCANNING SYSTEM

CROSS-REFERENCE TO RELATED APPLICATIONS

This application is a continuation of U.S. application Ser. No. 09/810,204, filed Mar. 16, 2001 now U.S. Pat. No. 6,628,445, which claims the benefit of U.S. Provisional Application No. 60/190,273, filed Mar. 17, 2000.

BACKGROUND

The present invention relates generally to optical scanning systems. More particularly, this invention relates to a scanning system containing a camera using a coplanar light source.

Various optical scanning systems have been developed for reading and decoding coded symbologies, identification of objects, comparison of objects, and measurement of objects. Each of these scanning systems utilizes either a non-coherent or coherent light source. Lighting is one of the key elements in obtaining good image quality. The intensity of light needed for scanning is directly proportional to the transport speed of the scanned object and the speed of the sensor. Generally, the faster an image is to be acquired, the more light is needed. Until now, only high intensity sodium or halogen lighting was adequate to obtain crisp images in cameras that focus over a significant depth of field at high speeds. The light source is usually located off axis from the camera and sensor detecting the light reflected from the object being scanned.

In applications using sodium lamps as a light source, the lamps are used to provide the illumination required by the camera detection means. These lamps provide an abundance of optical power because they are very bright and have a wide spectral range. There are, however, several disadvantages to sodium lamp light sources. First, due to their extreme brightness, sodium lamps can create an annoyance and possible hazard to workers working in the vicinity of the scanning systems. Second, sodium lights require a large amount of AC power, thus increasing production costs. Third, these light sources create a large amount of heat. Additionally, radio frequency interference can be created which can present operational problems to equipment in the vicinity of the scanning system.

The use of light sources such as LEDs presents several advantages over sodium and halogen lighting. LED illumination is a more cost effective and ergonomic method of illumination. The problem presented by LED illumination is how to get enough light to the object that is being imaged when focusing over a large depth of field. By eliminating the mounting angle between the light source and the line of sight of the camera lens, the reflected light is managed and a lower intensity light source may be used. Because LEDs can be energized almost instantaneously, they can be de-energized when objects are not being transported within the field of view. This extends the life of the LEDs and also conserves power. Additionally, the power input to individual LEDs may be modulated and pinpointed to a desired area, such that different LEDs within an LED array may be energized at different levels according to the desired application.

The use of a coherent or non-coherent light source which will provide sufficient optical illumination to an object to be scanned, which uses less energy while alleviating potential problems of radio frequency interference or heat emission is needed.

SUMMARY OF THE INVENTION

Briefly stated, the present invention provides an optical scanning system which uses a light source to provide an illumination stripe that is coplanar to a camera lens and light sensor for barcode reading applications. The light source may be coplanar to the lens axis and light sensor, and preferably is formed from LEDs or other low power consumption illumination sources. The coplanar design provides adequate illumination for a large depth of field at low speeds.

In another aspect, the invention provides a scanning system in which the light source is shifted relative to the line of sight of the camera such that the illumination stripe remains coplanar with the camera line of sight at the required depth of field. The light stripe profile coming from the array can therefore be narrow. The intensity of light required to illuminate an object over the depth of field is significantly reduced, thus allowing for the use of an LED array or other low power light source.

In another aspect, the invention provides a plurality of off-axis light sources to provide an illumination stripe on the object generally coplanar with camera line of sight at the required depth of field. Different arrays of lights sources are energized according to the depth of field of the target object, allowing adequate lighting over a range of distances.

DETAILED DESCRIPTION OF THE PREFERRED EMBODIMENTS

Figure 1:
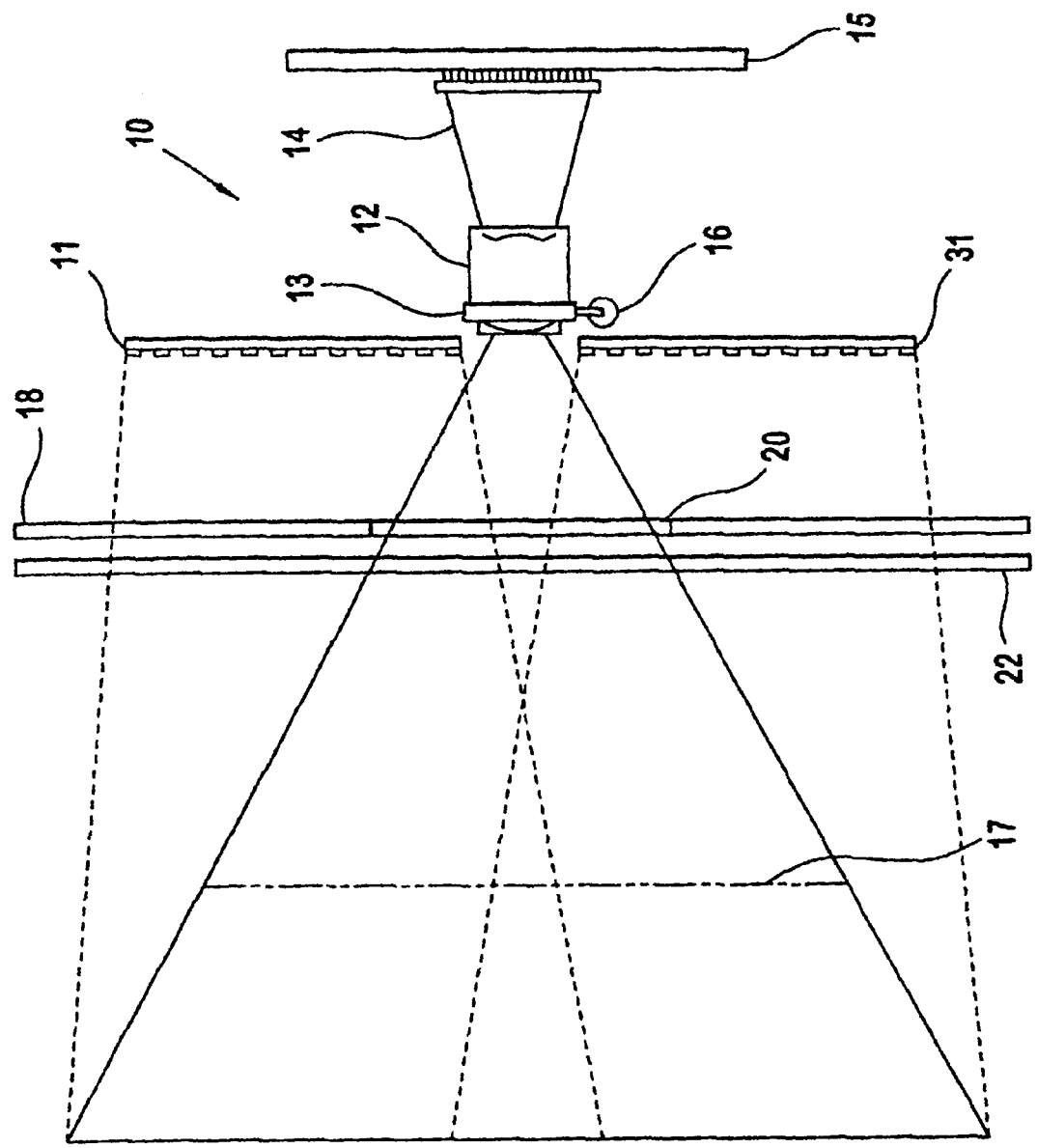
FIG. 1 is a side view of the coplanar camera in accordance with the preferred embodiment of the present invention.

The present invention will be described with reference to the drawing figures wherein like numerals represent like elements throughout.

Referring to FIG. 1, a coplanar camera scanning system 10 in accordance with the present invention is shown. The coplanar camera scanning system 10 preferably includes a light source 11, a camera lens 12, a focusing ring 13 for the lens 12, a linear array sensor 14, a window 22, a cylindrical lens 18, and a voice coil actuator 16. In the preferred embodiment, the light source 11 is comprised of one or more very high intensity LED arrays, although those skilled in the art will recognize other suitable lighting could be utilized, such as lasers or a laser line generator.

The light source 11 is used to illuminate a surface of a target object, indicated by broken line 17. The emitted light illuminates the target object and is reflected back to the coplanar aligned sensor 14. The coplanar camera scanning system 10 is preferably used to read barcode information from the scanned object. The coplanar camera scanning system 10 preferably utilizes a CMOS linear array sensor 14 to detect the light reflected from the object being scanned. In the first preferred embodiment a CMOS-based image sensor is referenced, but as those skilled in the art should know, any image sensor can be used, e.g., a CCD-based image sensor. The light reflected onto the CMOS linear array sensor 14 is generated in the preferred embodiment by very high intensity LEDs 11. The preferred embodiment of the present invention utilizes red LEDs within the array. As the technology regarding light sources advances, brighter, more intense LEDs can be used, including LEDs having different wavelengths. Also low power semiconductor lasers can be utilized.

Figure 2:
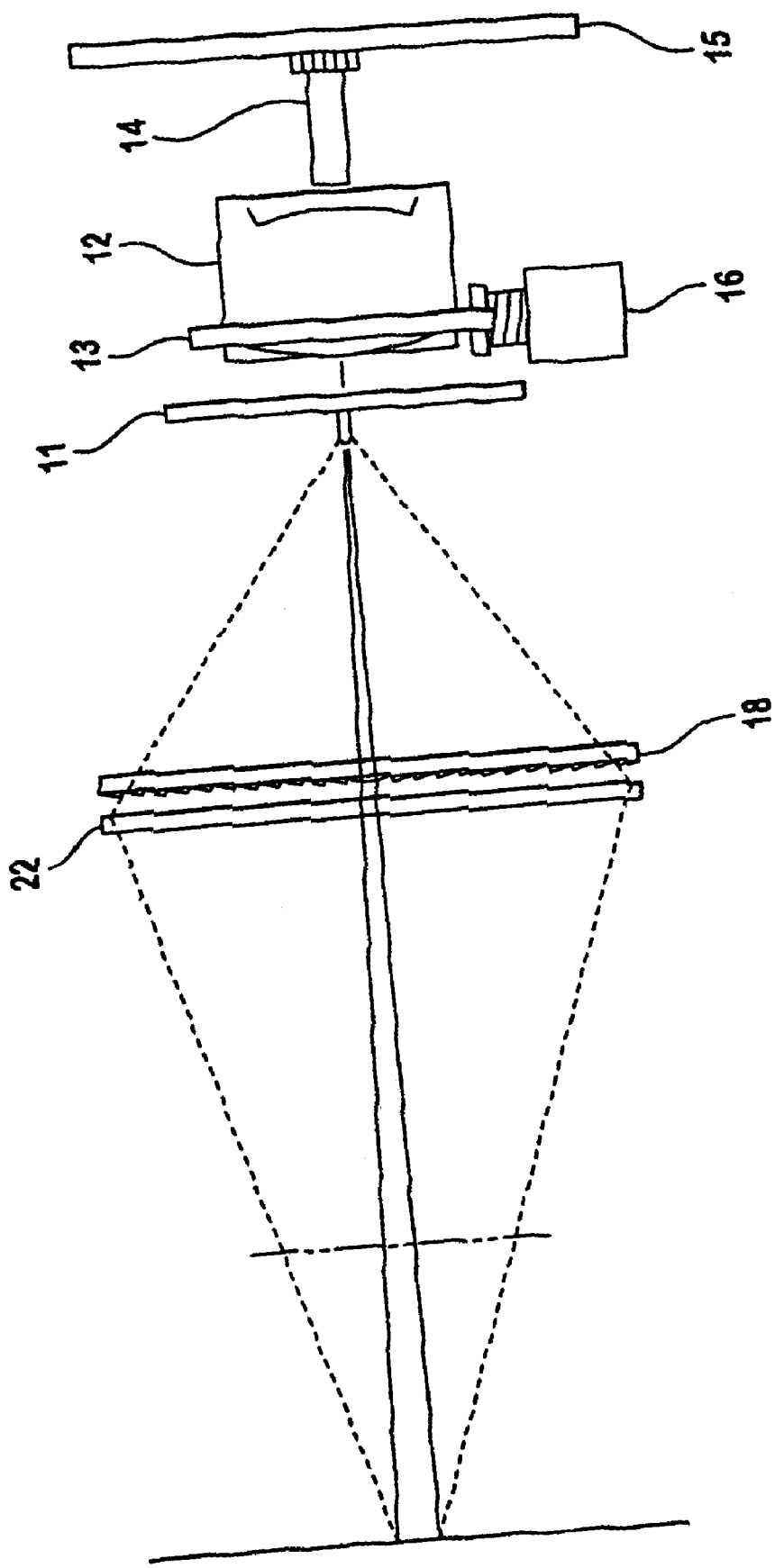
FIG. 2 is a top view of the coplanar camera in accordance with the preferred embodiment of the present invention.

The LED array 11 acts as the light source for the coplanar camera scanning system 10. As shown in FIG. 2, in the first preferred embodiment of the present invention, the light source 11 is positioned parallel to, and in the same plane as the CMOS linear array sensor 14. Those skilled in the art should realize that the light source 11 positioned in this manner is on-axis with the CMOS linear array sensor 14. The light source 11 preferably comprises a plurality of LEDs in series with each other, located on one or more circuit boards 31. In this embodiment, the coplanar camera utilizes two LED arrays to generate the required amount of light. In this embodiment, the light source 11 is positioned on each side of the camera lens 12. As should be clear to those skilled in the art, the number of LEDs required for each light source 11 differs based on the size of the conveyor belt and required depth of field. The present invention preferably utilizes 50 LEDs in each of the up to four arrays, totaling 200 LEDs. Alternatively, a desired number of low power semiconductor laser arrays may be mounted on the circuit board 31.

The light emitted from the light source 11 is focused to a narrow "stripe" on the object using a cylindrical lens 18. This cylindrical lens 18 is positioned parallel to and in between the light source 11 and the target object. In the present preferred embodiment a Fresnel lens is used, but as those skilled in the art should realize, any optical lens can be used in this application. As shown in FIGS. 1 and 2, the positioning of the cylindrical lens in relation to the light source 11 provides a narrow "stripe" of light anywhere within the depth of field. When the target object enters this scanning field, the illumination from the light source 11 illuminates the object. Due to the positioning of the sensor 14 relative to the light source 11, the CMOS linear array sensor 14 detects the most intense light provided by the light source 11.

Figure 3:
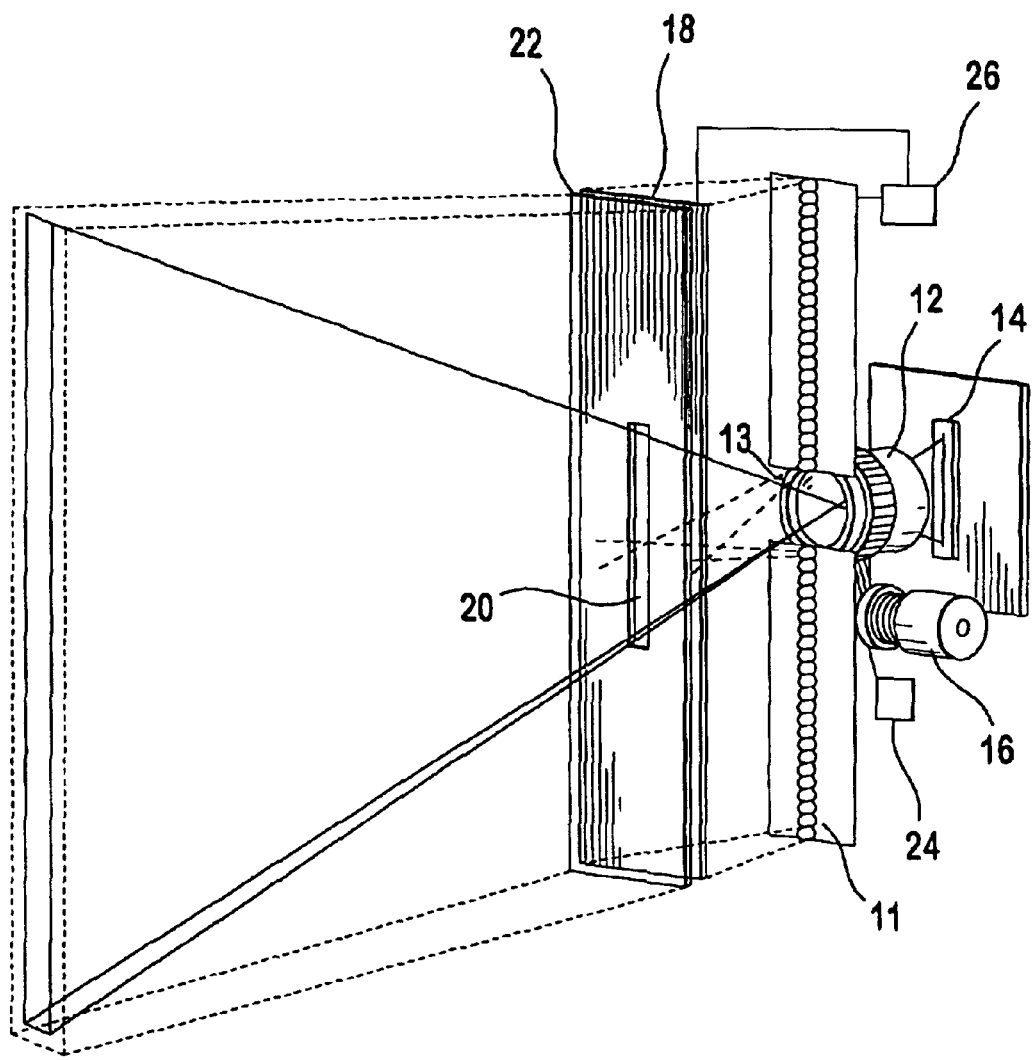
FIG. 3 is a front isometric view of the coplanar camera in accordance with the preferred embodiment of the invention.

As shown in FIGS. 1 and 3, the cylindrical lens 18 includes a center slit 20. This center slit 20 permits the light reflected from the target object to return through the cylindrical lens 18 to the camera lens 12 and then projected onto the CMOS linear array sensor 14.

In order to maximize the depth of field of the coplanar camera scanning system 10, the voice coil actuator 16 is coupled to the focusing ring 13 of the imaging lens 12 to dynamically focus the image onto the CMOS linear array sensor 14, based on a signal from a range finder 24. Those skilled in the art should recognize that there are many methods and apparatuses that can be used as range finders and for focusing. The signal received from the range finder 24 causes the voice coil actuator 16 to move the camera lens 12 and focus the light reflected from the object onto the linear array sensor 14.

Optionally, the invention may include a focusing mechanism 26 for the light source to more accurately focus the emitted light onto a scanned object. This enhances the image which is received by the camera lens 12 and projected onto the CMOS linear array sensor 14. The focusing mechanism 26 is coupled to the light source 11, and dynamically moves the position of the lens 18 with respect to the position of the light source 11. It should be noted that either the focusing mechanism 26 or the light source 11, or both, may be moved to focus the light. Such movement, of course, depends on the distance of the object from the co-planer camera 10. This alternative embodiment keeps the intensity of the illumination stripe maximized at any distance, providing a cleaner image for detection by the CMOS linear array sensor 14.

Figure 4:
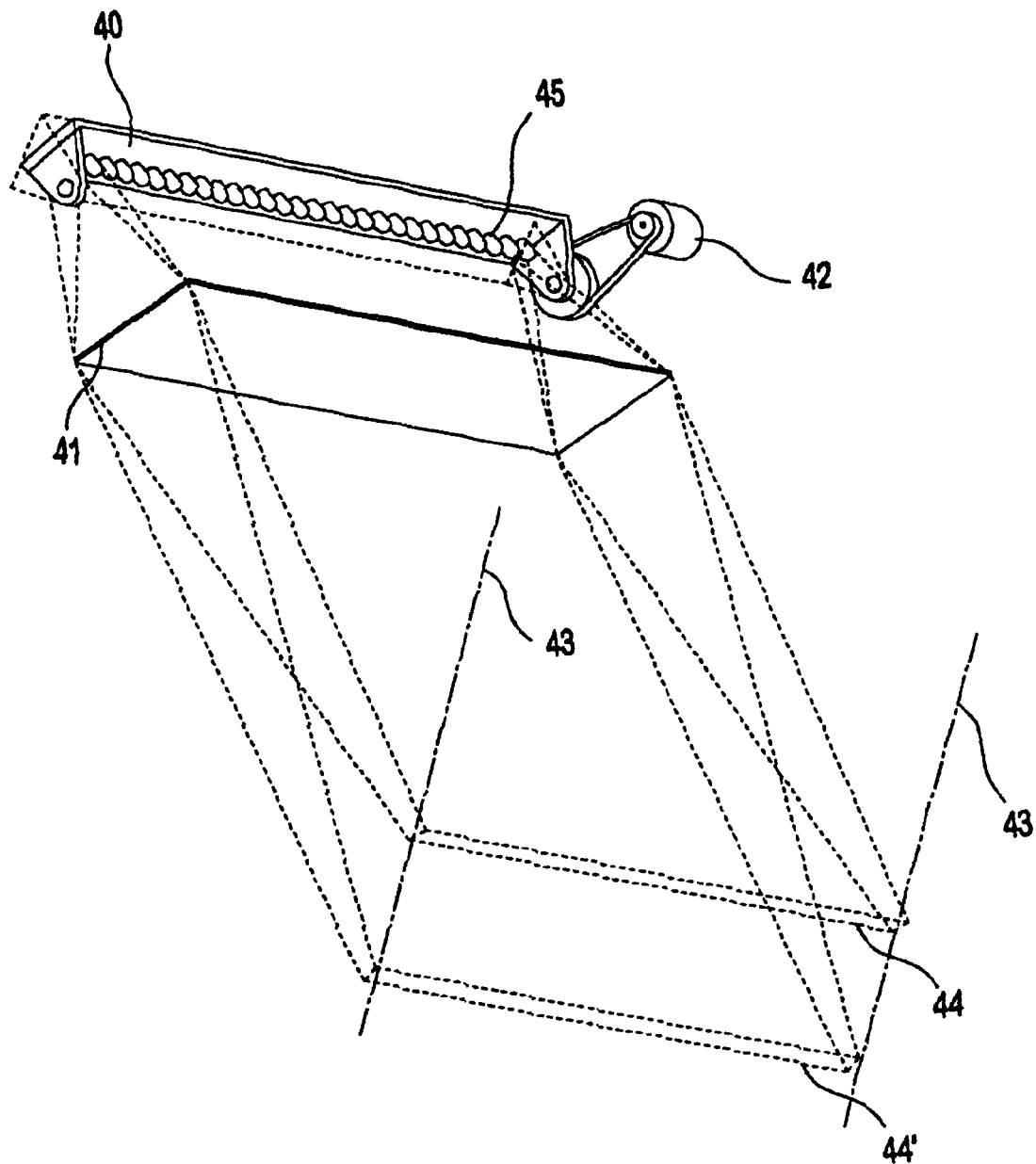
FIG. 4 is a side isometric view of a second embodiment of the invention with a movable array of light sources used in an off-camera lens axis orientation in accordance with the present invention.

Referring to FIG. 4, a second embodiment of the present invention uses an off axis light source 40 which is located off the camera lens axis and the linear array sensor, as represented by lines 43. The off axis light source 40 illuminates a target object by directing a beam of light onto its surface. However, the focused illumination stripe 44 is coplanar with the camera lens axis 43 and the linear sensor array at the required depth of field. The off axis light source 40 is preferably a movable array of LED sources 45 adapted to provide light to the target object. The invention, however, is not limited to this particular configuration or light source, as those skilled in the art will recognize alternative light sources from those described, such as semiconductor lasers, may be used.

The light source 40 may be focused by using an optional lens 41. The lens 41 may be any optical type lens, although a Fresnel lens is preferred. A light source positioner 42, preferably in the form of a controllable motor is connected to the light source 40 to allow movement of the light source 40. The positioner 42 is adapted to move the light source 40 based on a height of an object to be scanned, such that the focused illumination stripe 44, 44' is located on the surface of the object. The object height may be determined by a range finder or other means.

Figure 5:
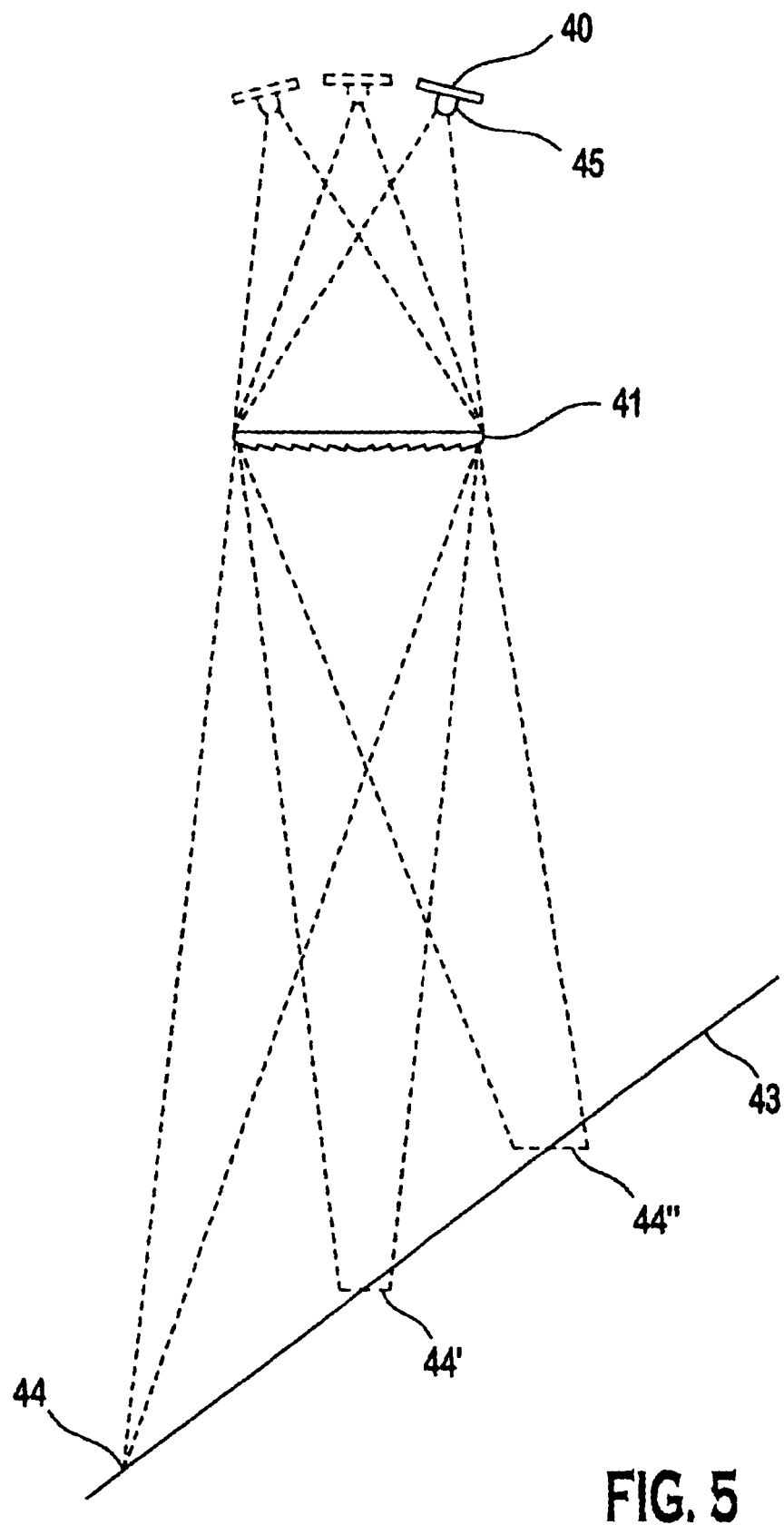
FIG. 5 is a side isometric view of a multiple row large depth of field illuminator in accordance with the present invention.

As shown schematically in FIG. 5, the position of the off axis light source 40 is infinitely variable. Accordingly, the illumination stripe 44, 44', 44" can be shifted to multiple positions depending on the required depth of field along the axis 43.

Figure 6:
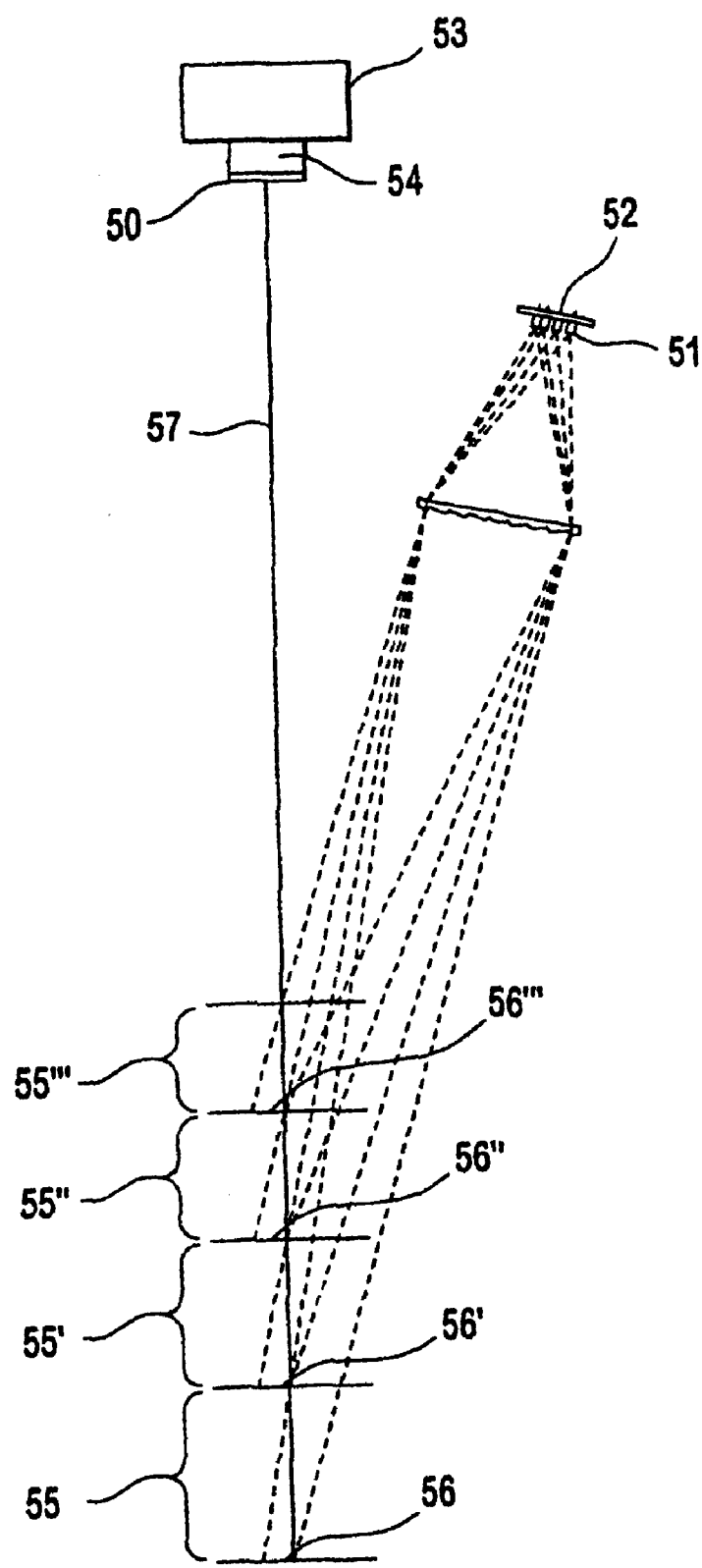
FIG. 6 is an end view of a movable light source in accordance with the present invention.

Referring to FIG. 6, a third embodiment of the invention is shown which includes multiple arrays of light sources 51 which are located on one or more circuit boards 52 placed off-axis to the lens 53 and the linear array sensor. A range finder 50 is connected to the array of light sources 51. The range finder 50 determines distance between the camera and the target object. The distance data is sent to a controller which then powers on or off selected arrays of light sources 51 focused to a corresponding depth of field 55, 55', 55", 55'" providing an illumination stripe 56, 56', 56", 56'" coplanar to the camera lens axis 57. The camera 53 and lens 54 detect the reflected light from the illumination stripe to read required data from the object. Alternatively, all of the light sources 51 may be activated to provide the desired illumination stripe at any depth of field, eliminating the need for the distance to the target object While the preferred embodiment of the invention has been described in detail, the invention is not limited to the specific embodiment described above, which should be considered exemplary. Further, modifications and extensions of the present invention may be developed based upon the foregoing, all such modifications are deemed to be within the scope of the present invention.

What is claimed is:

1. A system for scanning objects in an object scanning area on a support surface comprising:

a linear array sensor adapted to detect light input signals;

a lens optically connected to the linear array sensor, the lens adapted to receive and transmit an optical image located in an optical field of view of the linear array sensor;

a light source with a lens that produces an illumination plane that has a height that extends over a depth of field and a width that extends across the support surface so that an illumination stripe is formed on a surface of the object in the optical field of view; and the illumination plane and the optical field of view are coplanar over the depth of field in the object scanning area.

2. The system for scanning objects of claim 1, wherein the light source lens is a cylindrical lens.

3. The system of claim 2, wherein the cylindrical lens is a Fresnel lens.

4. The system for scanning objects of claim 1, wherein the linear array sensor is a CCD image sensor.

5. The system for scanning objects of claim 1, wherein the linear array sensor is a CMOS image sensor.

6. The system for scanning objects of claim 1, wherein the light source lens has a center slit co-planar with the optical field of view to allow reflected light from the surface of the object to return to the linear array sensor without being effected by the light source lens.

7. The system for scanning objects of claim 1, wherein the light source is an array of LEDs.

8. The system for scanning objects of claim 7, wherein the array of LEDs is linear.

9. The system for scanning objects of claim 8, wherein the linear array of LEDs, an axis of the light source lens and the illumination plane are coplanar.

10. The system for scanning objects of claim 1, wherein the light source is an array of semiconductor lasers.

11. The system for scanning objects of claim 10, wherein the array of semiconductor lasers is linear.

12. The system for scanning objects of claim 11, wherein the linear array of semiconductor lasers, an axis of the light source lens and the illumination plane are coplanar.

13. A system for scanning objects in an object scanning area, comprising:

a linear array sensor adapted to detect light input signals;

a lens optically connected to the linear array sensor, the lens adapted to receive and transmit an optical image located in an optical field of view to the linear array sensor; and a light source with a lens that produces an illumination plane that has a height that extends over a depth of field and a width that extends across the support surface so that an illumination stripe is formed on a surface of the object, the light source being positioned so that the optical field of view is coincident with the illumination stripe at the surface of the object.

14. The system for scanning objects of claim 13, wherein the light source includes multiple linear rows of light emitters.

15. The system for scanning objects of claim 14, wherein a controller is connected to the light source, the controller adapted to energize and de-energize selected linear rows of the light emitters.

16. The system for scanning objects of claim 13, wherein the light source lens is a cylindrical lens.

17. The system for scanning objects of claim 16, wherein the cylindrical lens is a Fresnel lens.

18. The system for scanning objects of claim 13, wherein the light source lens has a slit to allow reflected light from the surface of the object to return to the linear array sensor without being effected by the light source lens.

19. The system for scanning objects of claim 13, wherein the linear array sensor is a CMOS image sensor.

20. The system for scanning objects of claim 13, wherein the linear array sensor is a CCD image sensor.

21. The system of claim 13, further comprising an object height sensor which signals a controller to adjust a position of the illumination plane so that the illumination stripe at the surface of the object is coincident with the optical field of view.

* * * * *